United States Patent
Kawamura

[15] 3,665,781
[45] May 30, 1972

[54] SHEAVE DRIVE TYPE AUTOMATIC TRANSMISSION DEVICE

[72] Inventor: Katsuhiko Kawamura, Hamakita, Japan

[73] Assignee: Yamaha Hatsudoki Kabushiki Kaisha, Hamakita-shi, Japan

[22] Filed: Aug. 28, 1970

[21] Appl. No.: 67,692

[30] Foreign Application Priority Data

Sept. 1, 1969    Japan..................................44/82452

[52] U.S. Cl. ........................................................74/230.17
[51] Int. Cl. ............................................................F16h 55/52
[58] Field of Search............................................74/230.17 E

[56] References Cited

UNITED STATES PATENTS

| | | | |
|---|---|---|---|
| 3,597,987 | 8/1971 | Kiekhafer | 74/230.17 E |
| 2,158,367 | 5/1939 | Henney | 74/230.17 E |
| 3,066,546 | 12/1962 | Thostenson | 74/230.17 E |
| 3,280,648 | 10/1966 | Nelson | 74/230.17 E |

FOREIGN PATENTS OR APPLICATIONS

| | | | |
|---|---|---|---|
| 724,395 | 6/1962 | Canada | 74/230.17 E |
| 754,280 | 8/1956 | Great Britain | 74/230.17 E |
| U3453 | 9/1956 | Germany | 74/230.17 E |

Primary Examiner—C. J. Husar
Attorney—Flynn & Frishauf

[57] ABSTRACT

A stationary conical sheave member is fixed on the output shaft of an engine to rotate therewith. A movable conical sheave member faces said stationary half pulley member and is made slidable in the direction of its axis. A weight is pivoted on the output shaft, to control the shifting of the movable conical sheave member by a pawl portion; the contact plane of the movable conical sheave member along which the pawl portion of the weight slides has a convex curvature in the direction in which the pawl portion of the weight slides along said contact plane, so as to vary the speed-torque characteristics of the sheave drive to match it to the speed-torque characteristics of internal combustion engines.

7 Claims, 4 Drawing Figures

SHEAVE DRIVE TYPE AUTOMATIC TRANSMISSION DEVICE

The present invention relates to improvement in a sheave drive type automatic transmission device.

Movable cone-type transmission usually have a stationary conical sheave member fixed on the output shaft of an engine to rotate therewith; a movable conical sheave member defining with the non-slidable conical sheave member a drive transmission belt-receiving space which is progressively broadened toward the outside in radial direction. The movable conical sheave member also rotates with the output shaft and further slides therealong in longitudinal direction. A spring normally presses the movable conical sheave member away from the stationary conical sheave member. A weight is pivoted to a support fixed on the output shaft and, when the engine is put into operation, is rotatable about a fulcrum, due to centrifugal force acting thereon to cause its pawl portion to be slidably pushed along the contact plane of the movable conical sheave member toward the stationary conical sheave member.

Generally, a transmission device of the aforementioned type has torque characteristics as are indicated by the curve $T_1$ of FIG. 4. When the transmission device is combined with a slow speed engine having the characteristics represented by the curve $E_1$ of FIG. 4, then the stalling torque will reach a relatively high level indicated at A, whereas, when associated with a high speed engine (curve $E_2$), the stalling torque will appreciably decrease to a level indicated at B. As used herein, the term "stalling torque" is intended to mean the torque determined from the intersection of the torque characteristics of an engine and those of a transmission device. When a sports car, for example, is equipped with a high speed engine involving such a transmission device, the aforementioned fact results in the drawback that the car will have good start acceleration. To eliminate said drawback, it has been proposed to reduce the mass of the aforesaid weight or increase the spring force so as to shift the characteristics of the drive transmission device to a high speed side indicated at $T_2$, thereby elevating the stalling torque to a level indicated at C. In such case, however, the excess torque $\Delta T_2$ has an appreciably smaller value, as apparent from FIG. 4, than the excess torque $\Delta T_1$ when the engine runs at high speed or Rh. As a result, the belt is liable to slip, leading to significant transmission loss and in consequence reliable, positive power for a car.

Accordingly, an object of the present invention is to provide a sheave drive type automatic transmission device which is so arranged that the torque characteristics can be varied by a very simple means.

SUBJECT MATTER OF THE INVENTION

The contact plane of the movable conical sheave member is shaped to have a desired curvature in the direction in which the pawl portion of the weight slides along said contact plane; when combined with a high speed internal combustion engine, both high stalling torque and full excess torque at high speed operation are obtainable, thereby assuring its good starting acceleration combined with high maximum speed.

The present invention can be more fully understood from the following detailed description when taken in connection with reference to the accompanying drawings, in which.

Figure 4:
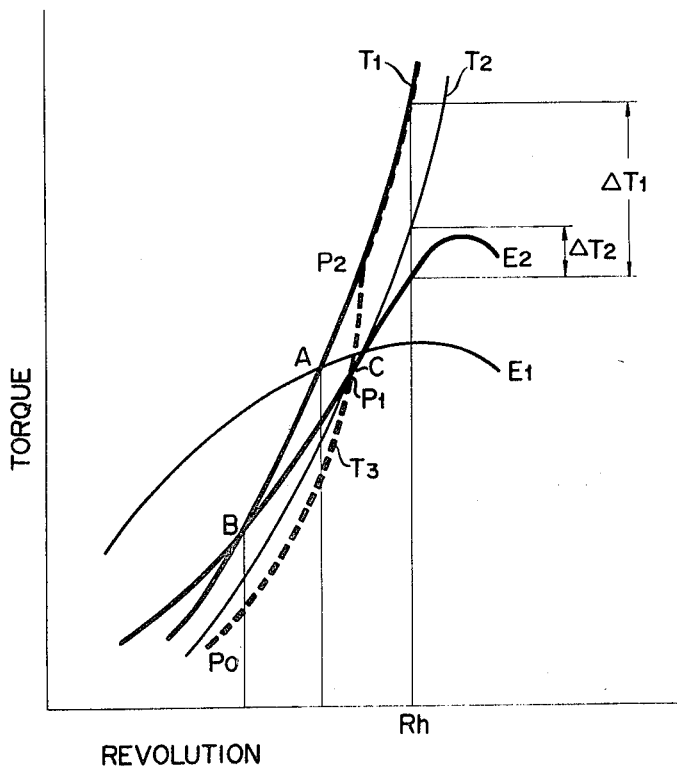
Figure 3:
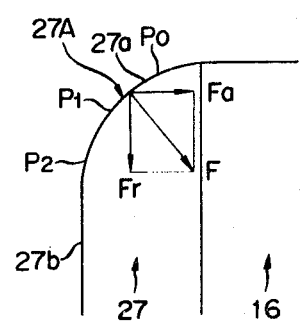

FIG. 3 shows the relationship between the contact plane (enlarged) of the movable conical sheave member and the vector of a force acting thereon; and FIG. 4 is a diagram showing the torque characteristics of the conventional sheave drive type automatic transmission devices $T_1$ and $T_2$, the automatic transmission device $T_3$ of the present invention, as well as of the commonly used slow speed type $E_1$ and high speed type $E_2$ of internal combustion engine.

Figure 1:
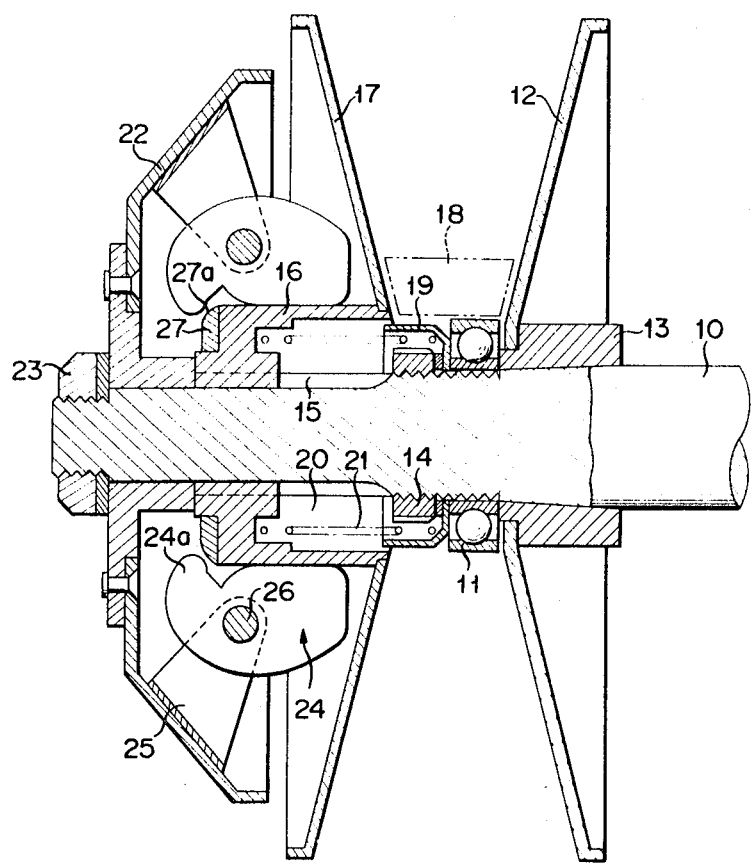
FIG. 1 is a longitudinal sectional view of a sheave drive type automatic transmission device according to an embodiment of the present invention.

Referring to FIG. 1, the reference numeral 10 is the output shaft of an engine. On the base end side of the output shaft 10 is fixed a conical sheave member 12, stationary with respect to shaft 10, and rotatable therewith, on a boss section 13 secured by the nut 14 acting over a race of bearing 11. On the outer end side of the engine shaft 10 is fitted a movable conical sheave member 17 secured to a boss section 16 engaging a spline 15 formed on the output shaft 10 in such a manner as to be prevented from rotating about the shaft 10, but to slide thereon in the longitudinal direction. Both conical sheave members 12 and 17 define a space progressively broadening to the outside in the radial direction so as to hold a V-shaped transmission belt 18 therebetween. Between the bearing 11 and nut 14 is positioned a spring support 19. A cavity 20 is provided in the boss section 16 of the movable conical sheave member 17. Cavity 20 has an inner end facing the spring support 19 which is open. A compression spring 21 is positioned between the bottom of the cavity 20 and the spring support 19 so as normally to urge the movable conical sheave member 12.

A weight supporting disc 22 is secured by nut 23 to the outer end of the output shaft 10. A plurality of weights 24 are supported on disc 22 at a prescribed equal angular interval by a pivot 26 through a bracket 25. When the output shaft 10 turns, the weight 24 rotates about the pivot 26 due to a centrifugal force acting thereon to urge, by its pawl portion 24a, the movable conical sheave member 17 toward the stationary conical sheave member 12 against the force of the spring 21.

The contact of the pawl portion 24a with the movable conical sheave member 17 is effected through a contact member 27 detachably fitted to the outer end of the boss section 16 and having a contact plane 27A at the outer side thereof. The contact member 27 may be of wear resistant material.

Figure 2:
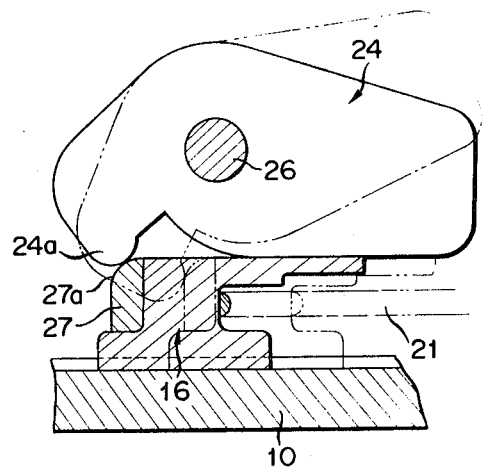
FIG. 2 is an enlarged sectional view of the main part of said embodiment illustrating its operation condition.

There will now be described by reference to FIGS. 2 to 4 the shape and function of the contact plane 27A of the movable conical sheave member 17 which is contacted by the pawl portion 24a of the weight 24. Said contact plane 27A may assume various shapes, as required. Where the transmission device of the present invention is used in the aforementioned high speed engine so as to elevate its start acceleration and obtain a full excess torque at high speed run, the following shape is required: when cut by a plane passing through the axial center of the boss section 16, the contact plane 27A of the movable conical sheave member 17 must be curved. The outer portion represents a convex quarter segment 27a of a circle and the remainder assumes a straight line 27b tangential to said quarter segment 27a.

There will now be described the function of the curved contact plane 27A by collating the contact point P of the pawl portion 24a of the weight 24 which moves along the curved contact plane 27A in accordance with the speed of the engine rotation, with the torque transfer characteristics of the present transmission device indicated by the curve $T_3$ of FIG. 4. The contact point P starts from the point $P_0$ and then, as the engine speed increases, moves along the segmental portion 27a toward the linear portion 27b. During this movement, the point P passes a point $P_1$ corresponding to the stalling torque and then through a point $P_2$ to the linear portion 27b. Now let it be assumed that the contact plane 27A all consists of a flat plane including the linear portion 27b and its extension. Then the torque characteristics of the transmission device will agree with those represented by the curve $T_1$. According to the present invention, however, a division from $P_0$ to $P_1$ assumes a segmental form 27a. In this division, therefore, as illustrated in FIG. 3, the movable conical sheave member 17 is actuated in effect only by the axial component $Fa$ of a force F exerted by the pawl portion 24a of the weight 24 on the contact plane 27A of said sheave member 17. Accordingly, the characteristics of the present transmission device indicated by the curve $T_3$ are brought appreciably nearer to the side of high speed rotation than those of the curve $T_1$, enabling the increase of the stalling torque even in a high speed engine. When the contact point P merges with the linear portion 27b at a point $P_2$, the characteristics of $T_3$ exactly agree with those of $T_1$, so that the excess torque at high speed run Rh attains a desired value $\Delta T_1$.

The contact plane of the movable sheave may be made of separate wear resistant material; it may be detachably secured thereto and be of low friction material.

I claim:

1. A sheave drive type automatic transmission device for the output shaft of an engine comprising a conical sheave member fixed on the output shaft of an engine to be rotatable therewith;

a movable conical sheave member defining with the stationary conical sheave member a drive transmission belt-receiving space which is progressively broadened toward the outside in the radial direction, said movable conical sheave member being mounted on the shaft for axial sliding movement;

spring means for normally biassing the movable conical sheave member away from the stationary sheave member;

a weight pivoted to a support fixed on the output shaft and, when the engine is put into operation, rotatable about a fulcrum due to a centrifugal force acting thereon, the weight having a pawl portion engaging the movable conical sheave member, thereby urging said movable conical sheave member toward the stationary conical sheave member;

and a contact surface forming the surface of engagement between said pawl and the movable conical sheave member, which is shaped to have a curvature in the direction in which the pawl portion of the weight slides along said contact plane upon rotation of the weight due to centrifugal force caused by shaft rotation, said contact surface when cut by a plane passing through the central axis of the shaft, being defined by a curvature consisting of an outer convex curve and a substantially straight line extending inwardly towards the shaft center from said outer convex curve.

2. The transmission device as claimed in claim 1, wherein the substance forming the contact surface of the movable sheave is made of a separate wear-resistant material subject to little friction and is detachably fitted thereto.

3. The transmission device as claimed in claim 1, wherein said movable sheave includes a boss section comprising a contact member made of a separate wear-resistant material fitted to its outer end, and said contact surface is formed at the outer side of said contact member.

4. The transmission device as claimed in claim 3, wherein the separate wear-resistant material is of low frictional coefficient.

5. The transmission device as claimed in claim 3, wherein the separate wear resistant material is detachably fitted to the outer end of said contact member.

6. The transmission device as claimed in claim 1, wherein the outer convex curve is a convex quarter segment of a circle, and said straight line is tangential to said convex quarter segment.

7. The transmission device as claimed in claim 2, wherein the outer convex curve is a convex quarter segment of a circle, and said straight line is tangential to said convex quarter segment.

* * * * *